United States Patent
Liao et al.

(10) Patent No.: US 9,710,286 B2
(45) Date of Patent: Jul. 18, 2017

(54) ENHANCED WAKEUP MODE

(71) Applicant: Acer Incorporated, New Taipei (TW)

(72) Inventors: Shu-Chun Liao, New Taipei (TW);
Yung-Shen Chen, New Taipei (TW);
Yu-Chuan Cheng, New Taipei (TW);
Tsung-Mao Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 191 days.

(21) Appl. No.: 14/527,981

(22) Filed: Oct. 30, 2014

(65) Prior Publication Data

US 2016/0124493 A1    May 5, 2016

(51) Int. Cl.
*G06F 1/32* (2006.01)
*G06F 9/44* (2006.01)
*G06F 1/20* (2006.01)

(52) U.S. Cl.
CPC ............ *G06F 9/4418* (2013.01); *G06F 1/206* (2013.01); *G06F 1/3209* (2013.01); *G06F 1/3256* (2013.01); *G06F 1/3265* (2013.01); *G06F 1/3268* (2013.01)

(58) Field of Classification Search
CPC ........ G06F 1/28; G06F 1/3265; G06F 1/3268; G06F 1/3287; G06F 1/3296; G06F 9/4418; Y02B 60/34
See application file for complete search history.

(56) References Cited

U.S. PATENT DOCUMENTS

| | | | |
|---|---|---|---|
| 6,289,464 B1 * | 9/2001 | Wecker | G06F 1/1616 340/7.33 |
| 9,182,808 B1 * | 11/2015 | Jones | G06F 1/3287 |
| 2011/0296058 A1 | 12/2011 | Cho et al. | |
| 2014/0075230 A1 * | 3/2014 | Suggs | H02J 7/35 713/323 |
| 2014/0380075 A1 * | 12/2014 | Pulapaka | G06F 1/3206 713/323 |
| 2015/0143151 A1 * | 5/2015 | Yun | H04N 5/63 713/323 |

FOREIGN PATENT DOCUMENTS

TW        201011553 A      3/2010

OTHER PUBLICATIONS

Taiwan Office Action, Jul. 27, 2015, 5 pages.
Taiwan Search Report, Jul. 28, 2015, 1 page.

* cited by examiner

*Primary Examiner* — Dennis M Butler
(74) *Attorney, Agent, or Firm* — Edell, Shapiro & Finnan, LLC

(57) ABSTRACT

A method of operating a computer that is in a sleep state and that is accessed remotely. The method includes receiving an indication that the computer should transition from a sleep state to a wake state, determining whether the indication was generated as a result of a remote access to the computer, and upon determining that the indication was generated as a result of a remote access to the computer, causing the computer to transition to a partial wake state.

16 Claims, 7 Drawing Sheets

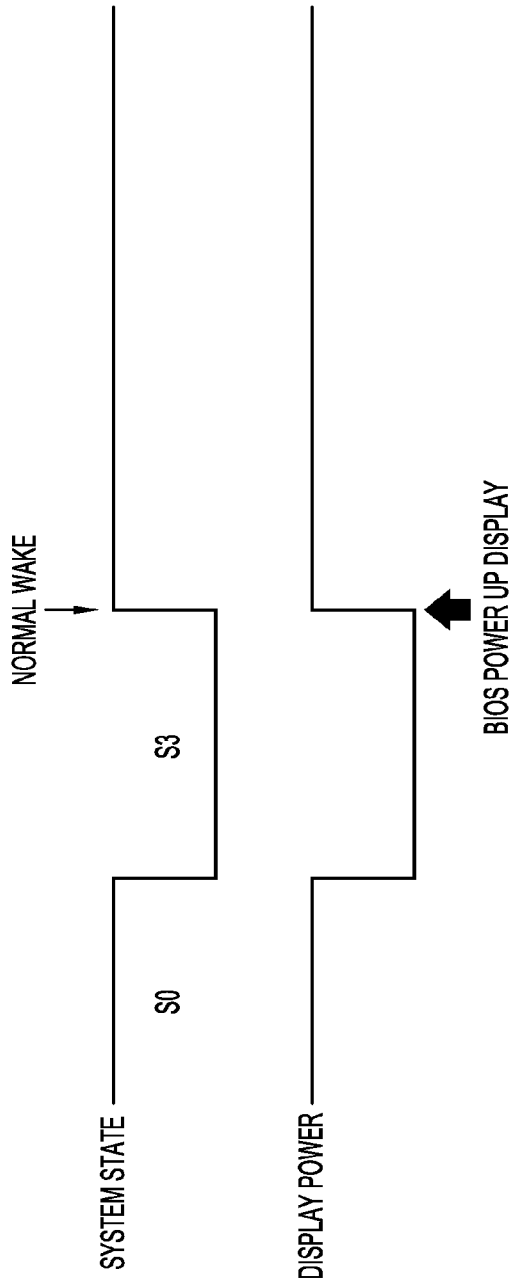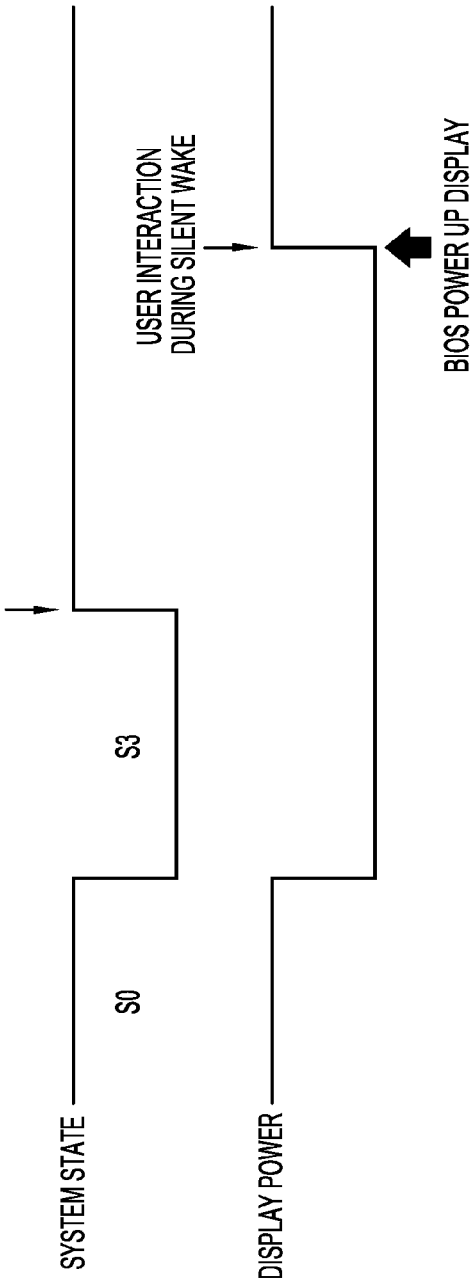

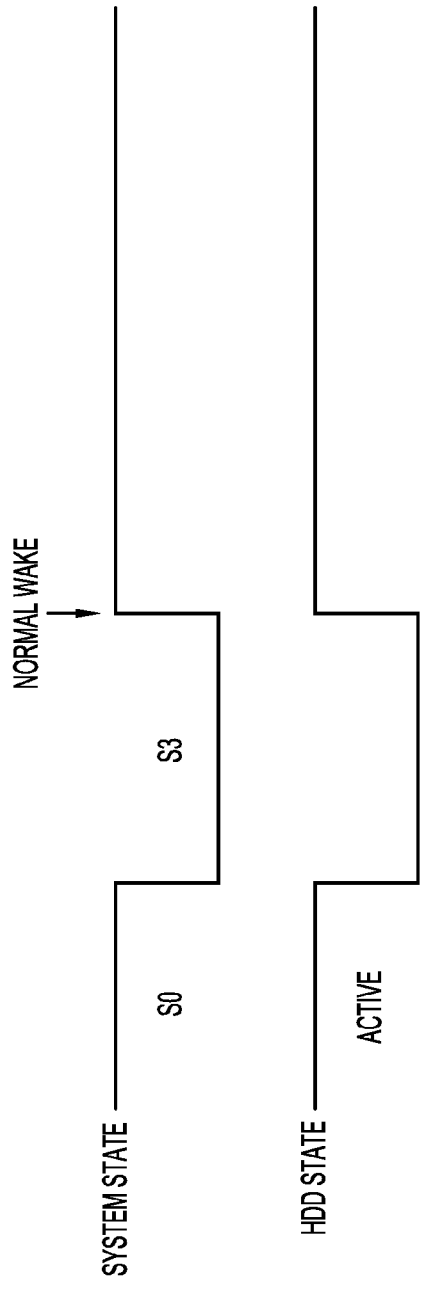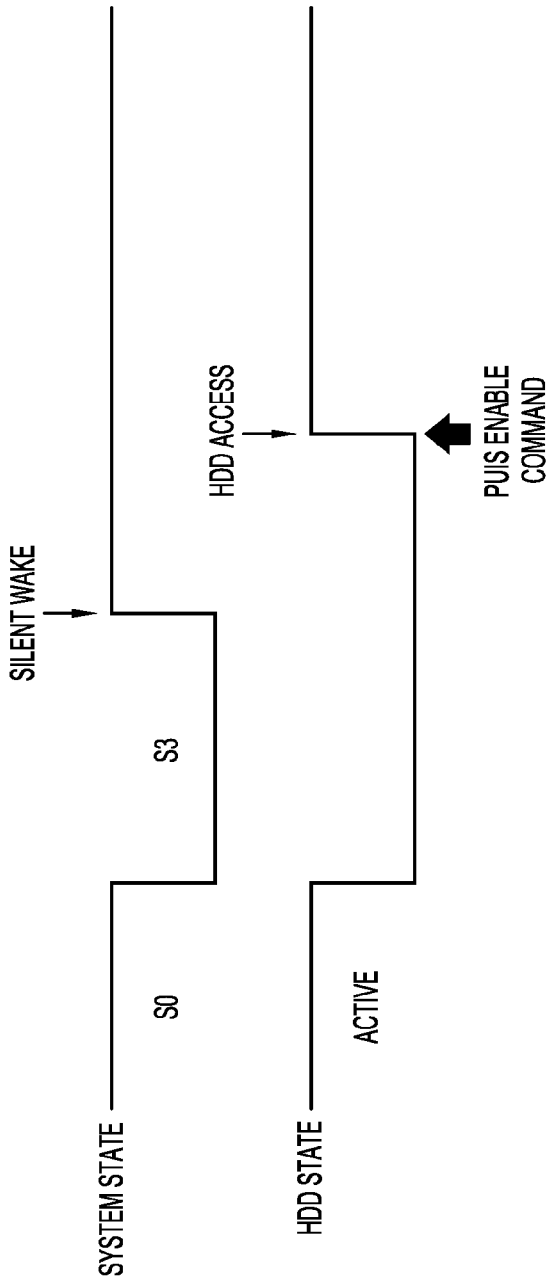

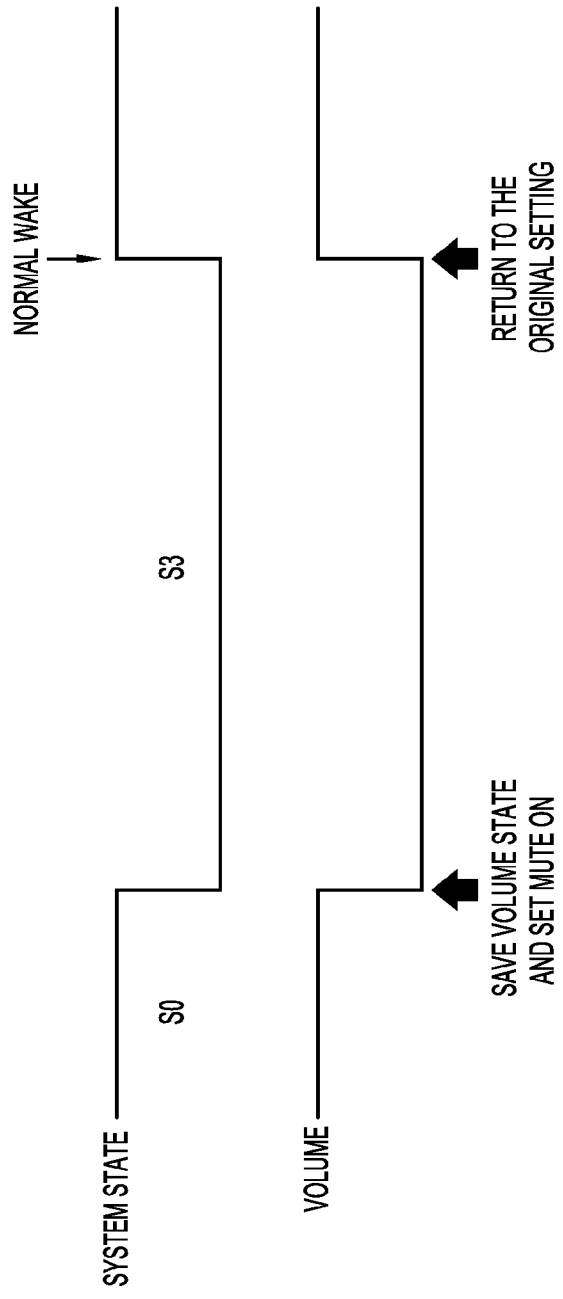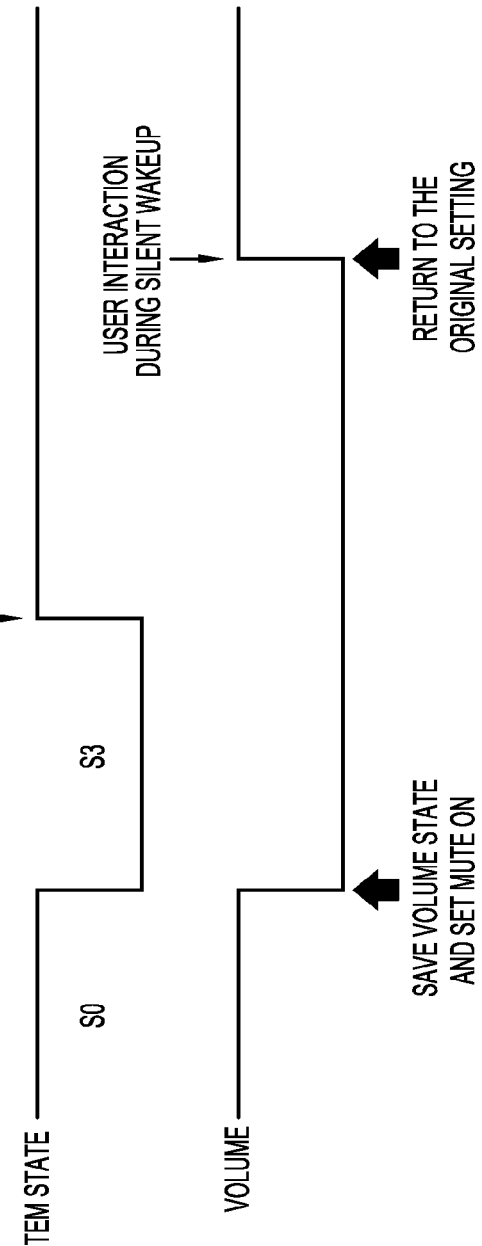

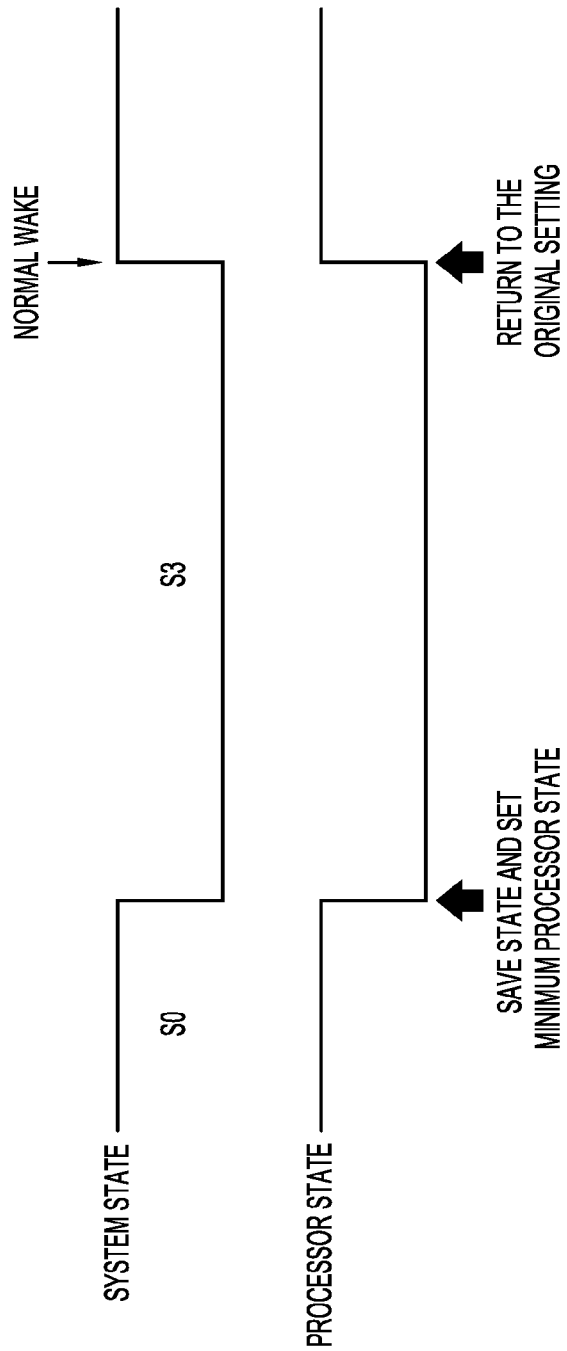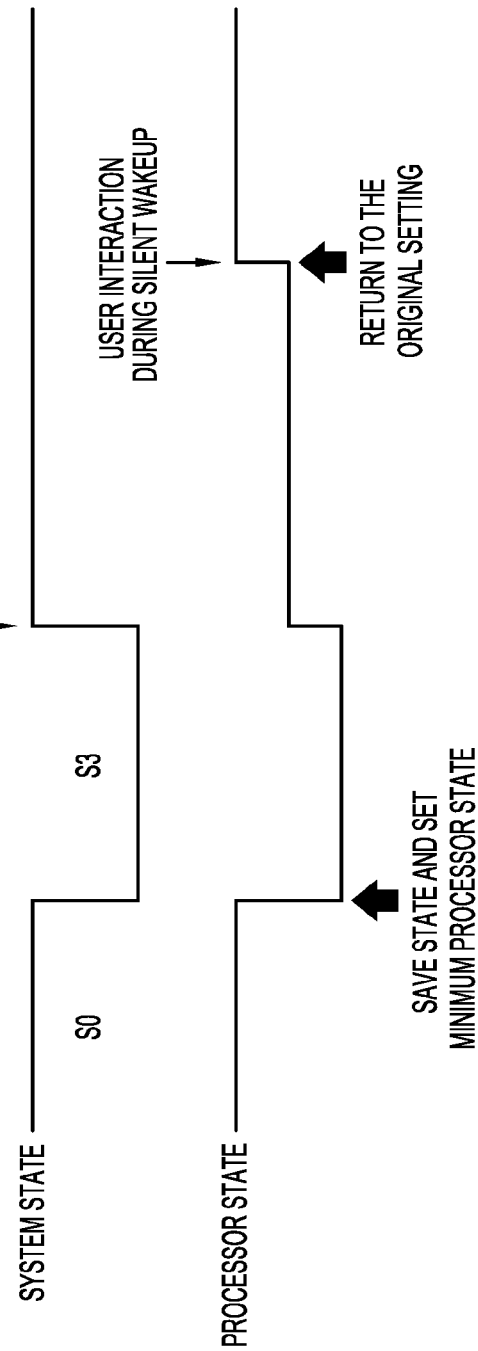

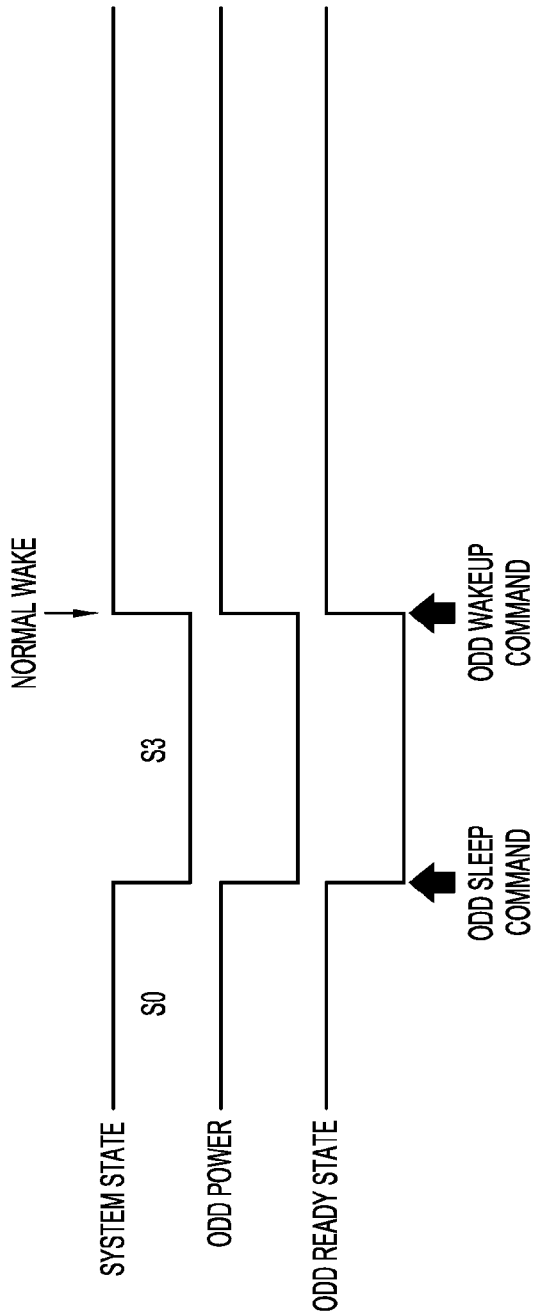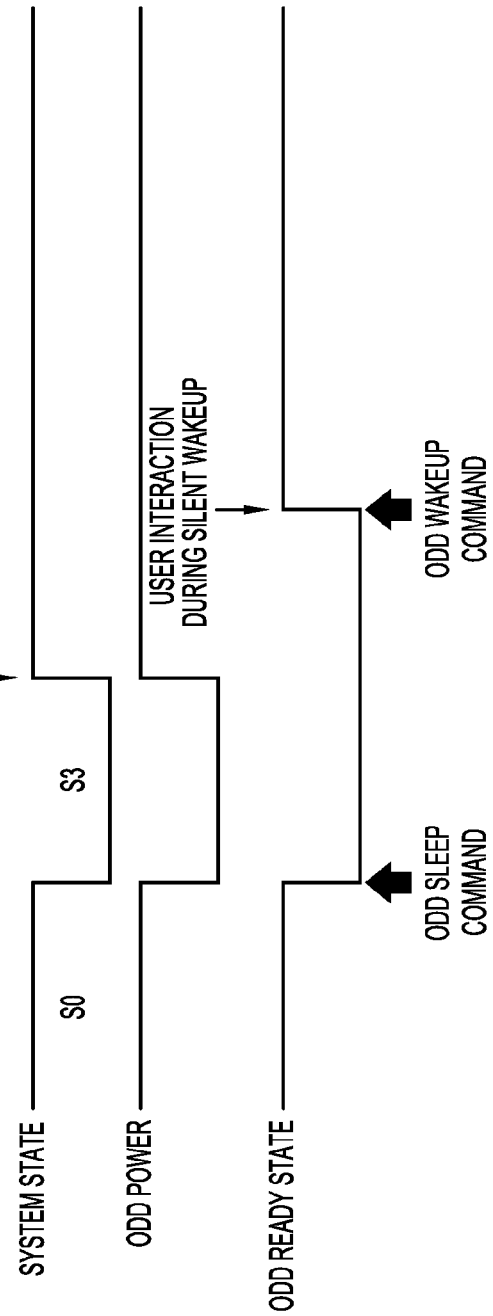

ENHANCED WAKEUP MODE

TECHNICAL FIELD

Embodiments of the present invention are directed to sleep and power management of an electronic device such as a computer.

BACKGROUND

The Advanced Configuration and Power Interface (ACPI) is an open industry specification that enables operating system-directed configuration, power management, and thermal management of mobile, desktop, and server platforms.

The ACPI defines six power states for computing devices: S0, S1, S2, S3, S4, and S5, as follows:

S0: the run state. In this state, the computing device is fully running.

S1: the suspend state. In this state, a central processing unit (CPU) suspends activity but retains its contexts.

S2/S3: sleep states. In these states, memory contexts are held, but CPU contexts are lost. The differences between S2 and S3 are in CPU re-initialization performed by firmware and device re-initialization.

S4: a sleep state in which contexts are saved to disk. The contexts are restored upon the return to S0. This is identical to a soft-off for hardware. This state can be implemented by either the operating system (OS) or firmware.

S5: the soft-off state. All activity stops and all contexts are lost.

In some computing devices that implement ACPI, states S1 and S2 are not employed. As a result, a given computing device is either in a sleep state S3/S4/S5 or in an active or run state S0.

SUMMARY

Described herein are methods of operating a computer that is in a sleep state and that is accessed remotely such that the computer transitions to an enhanced wake state, or "silent wakeup" state. In one embodiment, a method includes receiving an indication that the computer should transition from a sleep state to a wake state, determining whether the indication was generated as a result of a remote, versus local, access to the computer, and upon determining that the indication was generated as a result of a remote access to the computer, causing the computer to transition to a partial wake state, or silent wakeup state. In the partial wake state or silent wakeup state, any one or all of the following may occur: the display does not light up, a central processing unit is maintained in low power state, a hard disk drive is powered-up in a standby state, the volume from a speaker is kept muted and an optical disk drive does not read a disk in the drive.

BRIEF DESCRIPTION OF THE DRAWINGS

Embodiments are described herein in conjunction with the accompanying drawings, in which:

FIGS. 2A and 2B depict, respectively, the wakeup operation of a display of the computer in accordance with the prior art and in accordance with an embodiment of the present invention;

FIGS. 3A and 3B depict, respectively, the wakeup operation of a hard disk drive of the computer in accordance with the prior art and in accordance with an embodiment of the present invention;

FIGS. 4A and 4B depict, respectively, the wakeup operation of speaker volume of the computer in accordance with the prior art and in accordance with an embodiment of the present invention;

FIGS. 5A and 5B depict, respectively, the wakeup operation of a CPU and fan of the computer in accordance with the prior art and in accordance with an embodiment of the present invention;

FIGS. 6A and 6B depict, respectively, the wakeup operation of an optical disk drive of the computer in accordance with the prior art and in accordance with an embodiment of the present invention.

DESCRIPTION OF EXAMPLE EMBODIMENTS

Figure 1:
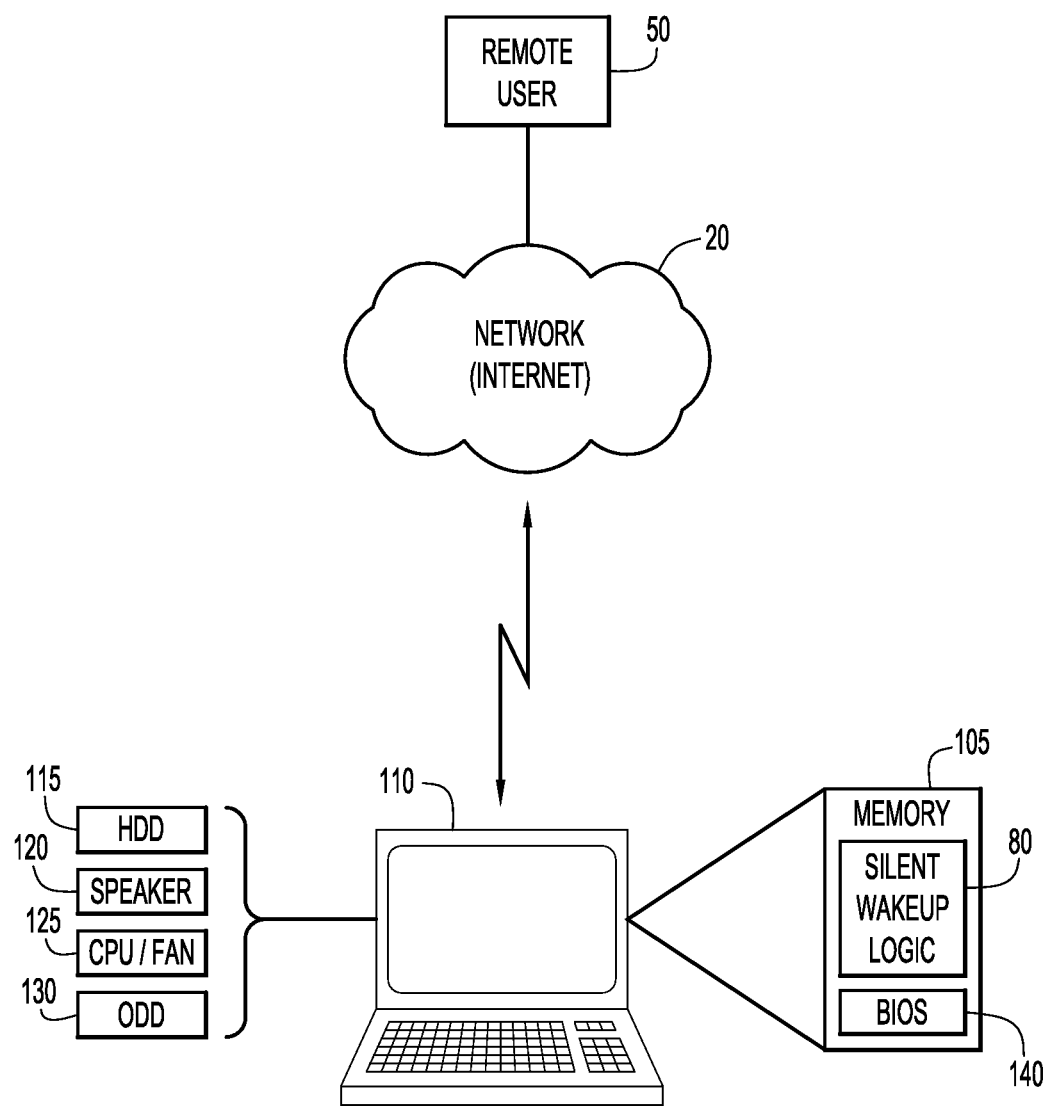
FIG. 1 is a block diagram of a computer that may be accessed by a remote user via a network and that is configured with "silent wakeup" logic in accordance with an embodiment of the present invention.

Cloud computing enables users to access, for example, storage, processing and database services, from remote computers "in the cloud." Typically, implementations for cloud computing employ a plurality of servers located in one or more data centers. Computers, operating remotely from a data center, access the data center via, e.g., the Internet, and cause the storage, processing and/or database services to be performed. Results of those services are then returned to the remote computer.

It is now becoming possible to implement a more limited, personal, "cloud computing" regime in which a user can keep, e.g., a personally-owned computer connected to the Internet, and then that user, or yet another user, can gain access to that personally-owned computer to obtain files, run applications, etc. The concept of keeping a computer connected to the Internet enables what is sometimes referred to as a computer that is "always on" or "always connected."

Such an always connected computer might be left in a home environment or office environment with other family members or colleagues in the same general area as the always connected computer. When the always connected computer is not being used, that computer will likely enter a sleep state, such as ACPI's S3 or S4 states. In such a state, a display of the computer is dark, a hard disk drive device (HDD) of the computer is idle, the volume of the speaker (if, e.g., music were previously playing) is muted, a CPU of the computer is in its lowest operational state, and an associated fan of the CPU is typically off. Further, an optical disk drive (ODD) is also likely idle. In such a sleep state, the always connected computer is not bothersome to anyone in the vicinity of the computer, and is in a reduced power consumption state.

When the user of the always connected computer is away from the home or the office environment, and subsequently wants, for example, to access a file stored on the always connected computer, that user can trigger a remote wake up the always connected computer and access the desired file. However, as soon as the always connected computer leaves its sleep state to read, e.g., the desired file from the hard disk drive, the computer will necessarily need to transition to a wake state, e.g., ACPI S0, whereby all of the components in the always connected computer will return to normal operation mode. In particular, but not necessarily in the following order, when the computer transitions to the wake state, the display will light up, the HDD will begin to operate, if the always connected computer was previously playing music prior to entering the sleep state (e.g., ACPI S3/S4), the music will resume, the CPU and fan will again operate, and the ODD will initiate motor rotation to read disk content.

Unfortunately, the operations that occur when transitioning to a wake state might startle or inconvenience people who are in the vicinity of the always connected computer.

In an effort to minimize the impact on people in the vicinity of the always connected computer, and to keep the always connected computer in a power saving mode akin to a sleep state as long as possible, the present disclosure describes techniques whereby the always connected computer can transition to a partial wake state or silent wakeup state when the transition to a wake state is a result of a remote, rather than a local, access to the always connected computer.

FIG. 1 is a block diagram of a computing device 10, such as a laptop, desktop, tablet, computer, etc., that may be accessed by a remote user 50 via a network 20, such as the Internet, and is configured with silent wakeup logic 80 in accordance with an embodiment of the present invention. That is, computing device 10 may be arranged to operate as an always connected computer as described above.

Computing device 10 comprises several components including memory 105, a display 110, a HDD 115, a speaker 120 that has a volume control, a CPU and fan 125 and an ODD 130. Also part of computing device 10 is a basic input/output system (BIOS) 140, which may include silent wakeup logic 80, or may be able to access the same. Memory 105 may comprise both silent wakeup logic 80 and BIOS 140. Memory 105 may comprise read only memory (ROM), random access memory (RAM), magnetic disk storage media devices, optical storage media devices, flash memory devices, electrical, optical or other physical/tangible memory storage devices. The foregoing components may be communicatively coupled with one another via, e.g., a bus (not shown). Those skilled in the art will appreciate that computing device 10 may include many other additional components. The components depicted in FIG. 1 and described herein, however, are sufficient to explain the inventive concepts of the present invention. That said, it should be noted that the scope of the present invention described herein should not to be limited to the components specifically described.

As previously noted, an object of the present invention is to avoid inconveniencing people in the presence of an always connected computer that transitions to a wake state without a user present. That is, because the always connected computer is triggered to transition to the wake state as a result of a remote access, the always connected computer will begin operating with a lit display and noises caused by mechanical components that are caused to operate, yet no user will be present.

A first aspect of the present invention, therefore, is functionality to distinguish between a remote wakeup event and a local wakeup event. Silent wakeup logic 80 and/or BIOS 140, in which silent wakeup logic may be incorporated, may be configured to determine whether a given wake event is triggered as a result of remote, or local, access. More specifically, computing device 10 may be provided with, e.g., an embedded controller (EC) (not shown) having multiple pins. At least two of such pins may be designated to monitor wake events. A first pin may be designated to, e.g., monitor a wake event caused by operation of a power button of computing device 10. A second pin may be designated to monitor a wake event caused by, e.g., wi-fi communication. Those skilled in the art will appreciate that operation of a power button on computing device 10 would be considered a local wake event, whereas wi-fi communication may be caused by a remote user attempting to access computing device 10, and thus would be considered a remote wake event. By connecting the first pin to receive signals indicative of a local wake event, and connecting the second pin to receive signals indicative of a remote wake event, it is possible, in accordance with the principles of the present invention, to then wake computing device 10 in a silent wakeup mode when the wake event is deemed to be a remote wake event, and avoid inconveniencing people in the vicinity of computing device 10.

In general, if the wake up event (event) is triggered by, e.g., a network card (LAN or WiFi or 3G) interrupt, such an event is considered a remote wakeup event. On the other hand, if, e.g., the power button, keyboard, touch screen, mouse or touch pad of computing device 10 is manipulated or operated, such an event can be regarded as a normal or local wakeup event. In the former case, silent wakeup is preferably performed, whereas in the latter case, normal wakeup, e.g., immediate transition into state S0, is preferably performed.

Once it has been determined that a remote wake event has occurred, then silent wakeup logic 80 is configured to transition computing device 10 to a silent wakeup state such that people in the vicinity of computing device 10 will be less likely to be startled or inconvenienced.

FIGS. 2A and 2B depict, respectively, the wakeup operation of a display of a computer in accordance with the prior art and in accordance with an embodiment of the present invention. More specifically, FIG. 2A is a timing diagram that shows that when a computer system is in state S0, power is supplied to a display. When the computing device transitions to a sleep state, e.g., S3, power to the display is removed. Then, as soon as the computer transitions again to a wake state, e.g., S0, BIOS 140, in accordance with the prior art, is configured to immediately supply power to the display.

In accordance with the present invention, however, in silent wakeup, i.e., when a transition from a sleep state is triggered by a remote wake event, power to display 110 is not immediately supplied to display 110, thereby keeping display 110 dark. That is, silent wakeup logic 80 is configured to keep display 110 powered down. It is only when a user interacts with computing device 10, e.g., by using a touch pad, mouse, or touch screen (e.g., a local wake event), will power be supplied to display 110 and cause display 110 to light up. As a result, when a remote user accesses always connected computer, the always connected computer will not power display 110 and thereby disturb people in the vicinity of computing device 10.

FIGS. 3A and 3B depict, respectively, the wakeup operation of a hard disk drive of a computer in accordance with the prior art and in accordance with an embodiment of the present invention. More specifically, FIG. 3A is a timing diagram that shows that when a system is in state S0, a HDD is in an active state, i.e., the hard disk is spinning. When the system transitions to a sleep state, e.g., S3, the HDD will likewise become inactive, and thus stop spinning. Then, in accordance with the prior art, as soon as the system transitions again to a wake state, e.g., S0, the HDD will immediately transition to an active state, and begin spinning.

With reference to FIG. 3B, and in accordance with the present invention, however, in the silent wakeup state, i.e., when a transition from a sleep state is triggered by a remote wake event, power to HDD 115 is not immediately supplied, thereby keeping HDD 115 from spinning. Instead, it is only when a user interacts with computing device 10, e.g., by using a touch pad, mouse, or touch screen (i.e., a local wake event), will HDD 115 be powered up to spin. As a result, when a remote user accesses an always connected computer, the always connected computer will not necessarily immediately supply power to HDD 115 and thereby disturb people in the vicinity of the computer.

In one embodiment, HDD 115 can be controlled using a "power-up in standby" command. More specifically, and in one embodiment, the Microsoft Windows™ operating system provides an application programming interface (API) called DeviceIoControl that enables computing device 10 to send commands to various devices, including HDD 115. Such an API can be used to control HDD 115 to power-up in standby, such that HDD 115 will not begin to spin until there is a need to access data on HDD 115.

FIGS. 4A and 4B depict, respectively, the wakeup operation of speaker volume of the computer in accordance with the prior art and in accordance with an embodiment of the present invention. More specifically, FIG. 4A is a timing diagram that shows that when a system is in state S0, volume is not muted. As the system transitions to a sleep state, e.g. S3, a state of the volume is saved, and the volume is thereafter set to mute. Then, as soon as the prior art system transitions again to a wake state, e.g., S0, the volume of a speaker returns to the previously-saved setting.

With reference to FIG. 4B, and in accordance with the present invention, however, in the silent wakeup state, i.e., when a transition from a sleep state is triggered by a remote wake event, the volume of speaker 120 remains muted. It is only when a user interacts with computing device 10, e.g., by using a touch pad, mouse, or touch screen (i.e., a local wake event), that the volume of speaker 120 will return to the previously-saved volume setting. As a result, when a remote user accesses an always connected computer, the always connected computer will not immediately play audio through speaker 120 and thereby disturb people in the vicinity of computing device 10.

In one embodiment, speaker volume can be controlled through an API. More specifically, and in one embodiment, the Microsoft Windows™ operating system provides an API called IAudioEndpointVolume that enables computing device 10 to control speaker volume. As part of this API there are functions including GetMute, which obtains the mute state, and SetMute, which can be used to cause the volume to be muted. Thus, if it is determined that a remote wake event has occurred, rather than allowing the volume to immediately return to its prior setting, the SetMute function can be used to keep the volume muted until such time as a user interacts with computing device 10, resulting in a local wake event and, consequently, a return to non-muted speaker volume.

FIGS. 5A and 5B depict, respectively, the wakeup operation of a CPU and associated fan of a computer in accordance with the prior art and in accordance with an embodiment of the present invention. More specifically, FIG. 5A is a timing diagram that shows that when a system is in state S0, a CPU is fully active. As the system transitions to a sleep state, e.g. S3, a state of the CPU is saved, and the CPU is thereafter placed into a minimum operational state. Then, and in accordance with the prior art, as soon as the system transitions again to a wake state, e.g., S0, the CPU returns to the previously-saved state and begins normal active operation. As a result, an associated fan will also begin to operate in an effort to remove heat generated by the operating CPU.

With reference to FIG. 5B, and in accordance with the present invention, however, in the silent wakeup state, i.e., when a transition from a sleep state is triggered by a remote wake event, CPU 125 does not immediately become fully active. Instead, it is only when a user interacts with computing device 10, e.g., by using a touch pad, mouse, or touch screen (i.e., a local wake event), that CPU 125 is caused to return to its prior setting or operational mode. In accordance with the present invention, CPU 125 is kept in a lower operational state until such time as full CPU operation is needed. As a result, when a remote user accesses an always connected computer, the always connected computer will not immediately cause CPU 125 and an associated fan to fully operate and thereby disturb people in the vicinity of computing device 10.

In one embodiment, CPU 125 can be controlled through an API. More specifically, and in one embodiment, the Microsoft Windows™ operating system provides APIs to set power options for processor 125, including setting a minimum and maximum processor state. Such states can be controlled using, e.g., the PowerReadACValueIndex and PowerReadDCValueIndex, which can record AC and DC processor states, and PowerWriteACValueIndex and PowerWriteDCValueIndex, which can be used to change power options. Because, in accordance with the present invention, CPU performance is adjusted to a lower state, CPU 125 will generate less heat such that an associated fan need not operate at all or as much as it might otherwise need to operate, thereby reducing generated noise.

FIGS. 6A and 6B depict, respectively, the wakeup operation of an optical disk drive (ODD) of a computer in accordance with the prior art and in accordance with an embodiment of the present invention. More specifically, FIG. 6A is a timing diagram that shows that when a system is in state S0, an ODD is fully active, meaning that it is fully powered and is in a ready state. As the system transitions to a sleep state, e.g. S3, the system sends an ODD sleep command to the ODD, and the ODD is thereafter placed into a sleep state. Then, and in accordance with the prior art, as soon as the system transitions again to a wake state, e.g., S0, the ODD returns to a fully operational state as soon as the system sends a wake up command to the ODD. After receiving the wake up command, the ODD initializes its motor and begins reading any disk in the drive.

With reference to FIG. 6B, and in accordance with the present invention, however, in the silent wakeup state, i.e., when a transition from a sleep state is triggered by a remote wake event, ODD 130 does not become fully active. Rather, when the S3 to S0 state transition occurs, power is provided to ODD 130, but the drive only returns to a ready state when an ODD wake up command is received. As a result, when a remote user accesses an always connected computer, the always connected computer will not immediately cause ODD 130 to fully operate and thereby disturb people in the vicinity of computing device 10.

The following describes how to send sleep and wake up commands to ODD 130.

Small Computer System Interface (SCSI) commands can be used to control selected devices in computing device 10. In addition, and perhaps more preferable is the use of the Advanced SCSI Programming Interface (ASPI), which provides the ability to control devices via the Microsoft Windows™ operating system. That is, Windows™ provides an ASPI Manager (wnaspi32.dll) that provides the following functions:

DWORD GetASPI32SupportInfo(void)
DWORD SendASPI32Command(LPSRB)

Additionally, ODD vendors can provide customized ASPI command, such as

ODD sleep command [F3 0D 3D 00 00 00 00 00 00 00 00]

ODD wake up command [F3 0D 3E 00 00 00 00 00 00 00 00 00]

Thus, a process to send sleep and wake up commands to ODD 130 may be implemented as follows:

Employ GetASPI32SupportInfo to determine ASPI driver and SCSI ODD is installed correctly; and employ SendASPI32Command to pass sleep and wake up commands to the ODD.

By controlling ODD 130 in this manner it is possible to keep ODD 130 in a non-spin state until such time as optical disk access is actually needed, thereby keeping computing device 10 from unnecessarily causing unnecessary disturbance.

Figure 7:
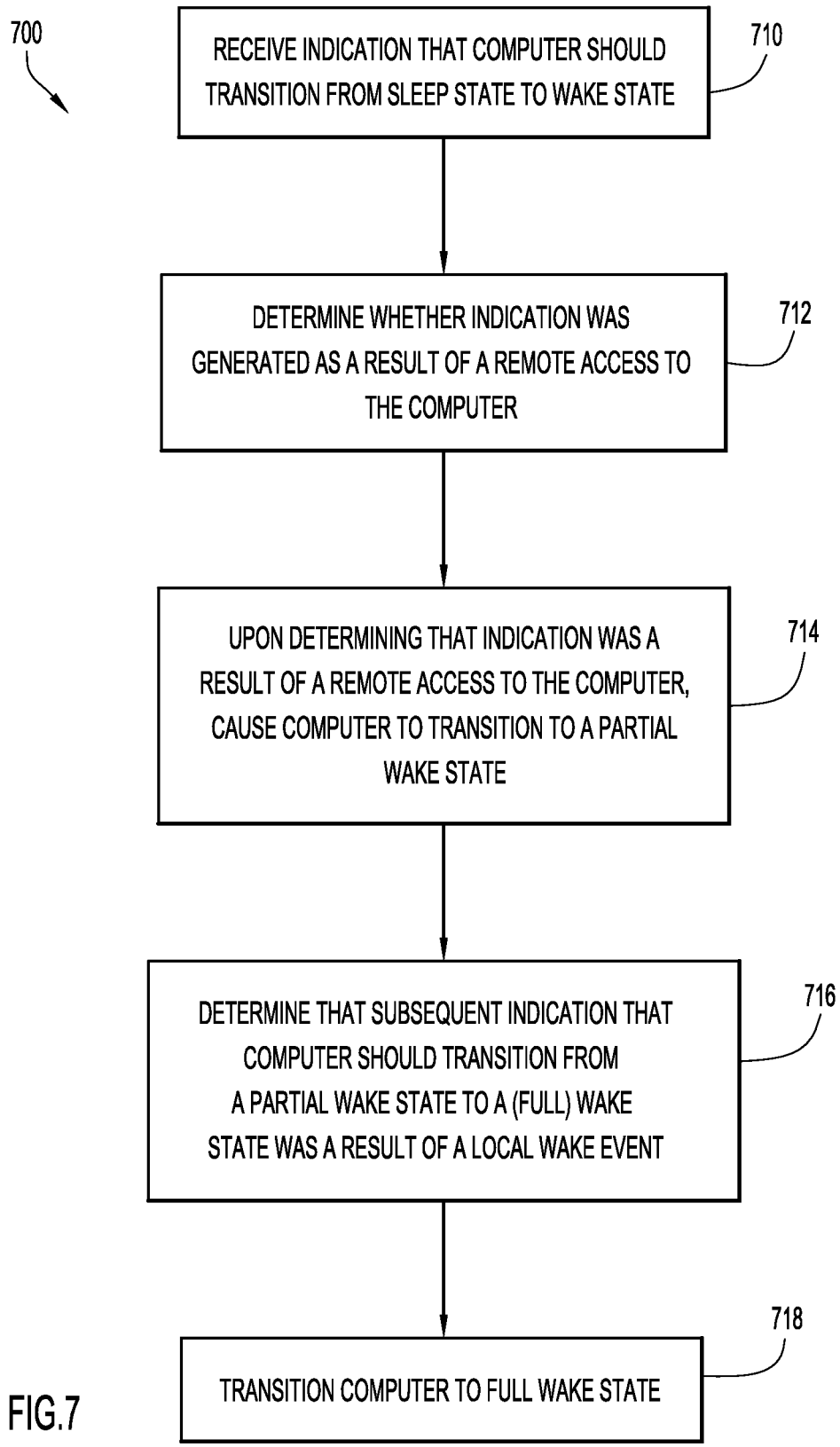
FIG. 7 depicts a series of operations performed by the computer in view of remote and subsequent local access to the computer in accordance with an embodiment of the present invention.

FIG. 7 depicts a series of operations performed by computer device 10 in view of remote and local access to the computing device 10 in accordance with an embodiment of the present invention.

Specifically, FIG. 7 depicts a series of steps 700 beginning with step 710 in which an indication that a computer should transition from a sleep state to a wake state is received. At step 712, it is determined whether the indication was generated as a result of a remote access to the computer, i.e., a remote access event has occurred. Then, at step 714, upon determining that the indication was a result of a remote access to the computer, the computer is caused to transition to a partial wake state or silent wakeup state.

At step 716, it is determined whether a subsequent indication that the computer should transition from i.e., partial wake state to a (full) wake state is a result of a local wake event. If so, at step 718, the computer is transitioned to a full wake state. The operations illustrated in FIG. 7 may be performed at least in part by silent wakeup logic 80, which logic may be encoded in one or more tangible (non-transitory) computer storage medium (e.g., embedded logic such as an application specific integrated circuit, digital signal processor instructions, or software that is executed by CPU 125 or BIOS 140.

In sum, the system described herein defines a new partial wake state or silent wakeup state that is triggered upon determination that a wake event that causes a computer to transition from a sleep state to an active state is a result of a remote access to the computer. In the partial wake state or silent wakeup state, any one or all of the following may occur: the display does not light up, a CPU is maintained in a low power state, a HDD is powered-up in a standby state, the volume from a speaker is kept muted and an ODD does not immediately read a disk in the drive.

The above description is intended by way of example only.

What is claimed is:

1. A method of operating a computer that is configured to be accessed remotely and that is in a sleep state, comprising:
   receiving an indication that the computer should transition from a sleep state to a wake state;
   determining whether the indication was generated as a result of a remote access to the computer, wherein the determining is based on detecting an interrupt caused by at least one of a local area network or a wireless access event; and
   upon determining that the indication was generated as a result of a remote access to the computer, causing the computer to transition to a partial wake state that is different from a wake state that is caused as a result of a local user manipulation of the computer.

2. The method of claim 1, wherein causing the computer to transition to a partial wake state comprises maintaining a display of the computer in a powered off state.

3. The method of claim 1, wherein causing the computer to transition to a partial wake state comprises setting a hard disk drive of the computer to a standby state.

4. The method of claim 1, wherein causing the computer to transition to a partial wake state comprises maintaining a mute state of a speaker of the computer.

5. The method of claim 1, wherein causing the computer to transition to a partial wake state comprises maintaining an optical disk drive in a non-spin state.

6. The method of claim 1, wherein the sleep state is in accordance with state S3 or S4 of the Advanced Configuration and Power Interface (ACPI) specification.

7. The method of claim 1, further comprising determining from a subsequent indication that the computer should transition from the partial wake state to a wake state as a result of a local wake event, and transitioning the computer to a full wake state.

8. The method of claim 7, wherein the local wake event comprises operation of at least one of a power button, touchpad, mouse or touch screen of the computer.

9. The method of claim 7, wherein the full wake state is in accordance with state S0 of the Advanced Configuration and Power Interface (ACPI) specification.

10. A computer, comprising:
    a display;
    a memory; and
    silent wakeup logic stored in the memory, wherein the silent wakeup logic, when executed, is configured to:
      receive an indication that the computer should transition from a sleep state to a wake state;
      determine whether the indication was generated as a result of a remote access to the computer by detecting an interrupt caused by at least one of a local area network or a wireless access event; and
      upon determining that the indication was generated as a result of a remote access to the computer, cause the computer to transition to a partial wake state that is different from a wake state that is caused as a result of a local user manipulation of the computer.

11. The computer of claim 10, wherein the silent wakeup logic, when executed, is further configured to cause the computer to transition to a partial wake state by maintaining the display in a powered off state.

12. The computer of claim 10, wherein the silent wakeup logic, when executed, is further configured to cause the computer to transition to a partial wake state by setting a hard disk drive of the computer to a standby state.

13. The computer of claim 10, wherein the silent wakeup logic, when executed, is further configured to cause the computer to transition to a partial wake state by maintaining a mute state of a speaker of the computer.

14. The computer of claim 10, wherein the silent wakeup logic, when executed, is further configured to cause the computer to transition to a partial wake state by maintaining an optical disk drive in a non-ready state.

15. The computer of claim 10, wherein the sleep state is in accordance with state S3 or S4 of the Advanced Configuration and Power Interface (ACPI) specification.

16. The computer of claim 10, wherein the silent wakeup logic, when executed, is further configured determine from a subsequent indication that the computer should transition from the partial wake state to a wake state as a result of a local wake event, and transition the computer to a full wake state.

* * * * *